Figure 1:
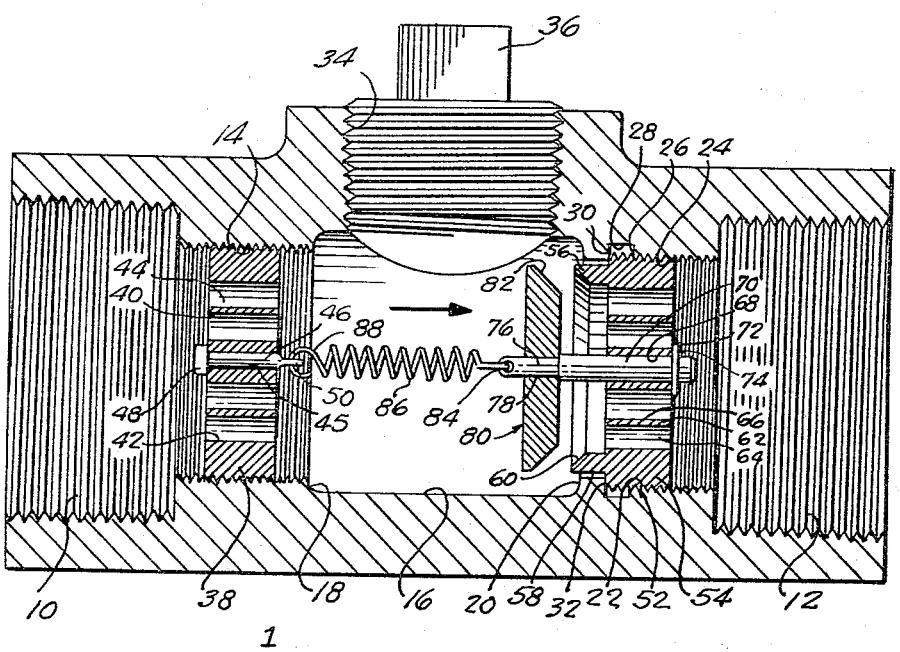

July 18, 1967      R. H. KIRK      3,331,389

SAFETY CUT-OFF VALVE

Filed April 23, 1965

INVENTOR.
RAYMOND H. KIRK,
BY
Berman, Davidson & Berman
ATTORNEYS.

United States Patent Office 3,331,389
Patented July 18, 1967

3,331,389
SAFETY CUT-OFF VALVE
Raymond H. Kirk, Rte. 1, Box 86,
McAlister, N. Mex. 88427
Filed Apr. 23, 1965, Ser. No. 450,281
1 Claim. (Cl. 137—516.11)

This invention relates to a safety cut-off valve, for use between a source of fluid under pressure and utilization means, which is designed to be closed by the occurrence of an excessive differential pressure from the source, as upon the rupturing of the diaphragm of a pressure regulator of such source.

The primary object of the invention is the provision of a simple, efficient, inexpensive and practical device of the kind indicated which, although usable in other applications, is primarily devised for connection in the supply line of an L.P.G. container, between the pressure regulator thereof and the appliance or appliances served thereby, such as domestic and other lighting and heating equipment, whereby, upon the development of a defect in the pressure regulator producing excess gas pressure to the appliances, the supply of gas to the appliances is desirably cut off, in the interest of safety, including prevention of fire hazards, which would then exist, due to the consequent substantial drop in gas pressure to the appliances.

Figure 2:
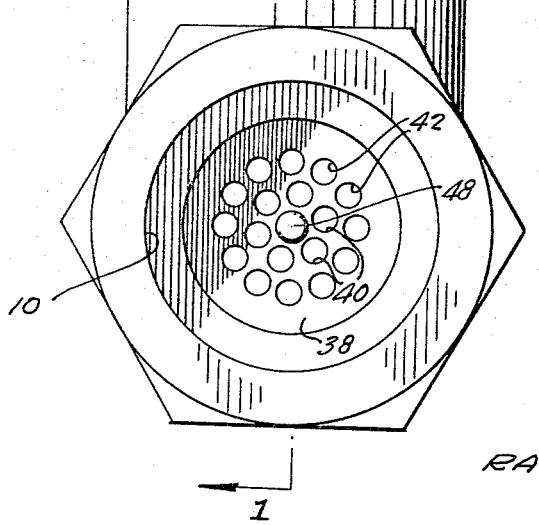

In the drawing:

FIGURE 1 is a longitudinal section, taken through a device of the invention, showing the valve element in open position; and FIGURE 2 is an end elevation of FIGURE 1.

Referring in detail to the drawing, the illustrated device comprises a longitudinally-elongated tubular body having maximum diameter threaded counterbores 10 and 12 at its inlet and outlet ends, into which a fluid supply line and a fluid pressure outlet line (not shown) respectively, are adapted to be secured.

The inlet counterbore 10 opens into an axial reduced-diameter threaded inner bore portion 14 which, in turn, opens into a central smooth bore portion or valve chamber 16, which is slightly larger in diameter than the threaded inner bore portion 14. The chamber 16 terminates in concave ends 18 and 20, which are fared into the inner end of the inner bore portion 14, and into the iner end of an inlet bore portion 22, respectively.

The outer inner bore portion 22 is preferably slightly smaller in diameter than the inlet inner bore portion 14, but is of substantially the same length. The inner outlet bore portion 22 is threaded, as indicated at 24, from its outer end as far as the outer side 26 of an annular groove 28, formed in the sidewall of the inner bore portion 22. The inner side of the groove 28 is deeper than the outer side, and extends farther in a radially-inward direction, so as to define an annular stop shoulder 32 which is engaged by the portion 54 of an outlet orifice member 52. The inner bore portion 22 opens at its outer end with the enlarged diameter outlet counterbore 12.

A radial threaded bore 34, opening into the chamber 16, is provided for servicing the valve mechanism, and is normally closed by a plug 36.

The valve mechanism comprises a cylindrical inlet orifice member 38 which is threaded in and is shorter than the inner inlet bore portion 14. The member 38 is formed with concentric inner and outer rings of longitudinal passages 40 and 42, respectively, extending therethrough, which are separated by relatively thin walls 44. A smooth axial bore 45 extends through the member 38, through which a smooth pin 46 extends, which has an enlarged head 48 on its outer end which bears against the outer end of the orifice member, and a flattened and apertured ear 50 on its inner end, which extends into the chamber 16.

The outlet orifice member 52 has a main externally-threaded portion 54 which is threaded in the outer inner-outlet bore portion 22 and extends across the groove 28 and abuts the inner side 30 of the groove 28. The outlet orifice member 52 terminates, at its inner end, in a smooth reduced-diameter end portion 56 which extends into the chamber 16, and is slightly smaller in diameter than a smooth portion 58 at the inner end of the outlet inner-bore portion 22.

The inner end of the smooth portion 58 is formed with a beveled valve seat 60. Like the inlet orifice member 38, the outlet orifice member 52 is formed with similar concentric passages 62 and 64, separated by thin walls 66, and with an axial smooth bore 68.

A smooth valve stem 70 is engaged through the outlet orifice member bore 68 and extends into the chamber 16, beyond the valve seat 60. A washer 72 is circumposed on the outer end of the valve stem and is retained in place as by a cotter pin 74, and normally bears against the outer end of the outlet orifice member 52.

The part of the valve stem 70 which normally extends into the chamber 16 is formed with a reduced-diameter axial inner end portion 76 which extends securably through an axial bore 78 which extends through a disc valve 80, and inwardly therebeyond. The valve 80 is formed with a beveled edge peripheral surface 82 which, in the closed position of the valve, conformably and sealingly engages the valve seat 60.

The inner end portion 76 of the valve stem 70 is apertured to receive a hook 84 on the related end of a coil spring 86, which has a hook 88 on its other end, which is engaged through an aperture in the ear 50 of the pin 46 of the inlet orifice member 38.

The tension of the spring 86 which normally serves to position and hold the valve 80 off of and inwardly away from the valve seat 60, is only sufficient to resist displacement of the valve toward the valve seat 60 by normal fluid pressure into the chamber 16, through the inlet orifice 38, and passing out through the outlet orifice 52, but insufficient to resist a substantially above-normal fluid pressure entering the chamber 16. As a result, the occurrence of such an abnormally great fluid pressure, consequent upon a failure of a pressure regulator interposed between the source of fluid pressure and the safety valve, produces seating of the valve 80 against the valve seat 60. This positively prevents abnormally high delivery of fluid pressure to the appliance or appliances which are connected to the outlet end of the safety valve.

What is claimed is:

A device of the character described, comprising a tubular valve body having first and second ends, means on said ends for connection thereto of inlet and outlet fluid pressure lines, said body being formed with a central chamber, inlet and outlet bore portions leading into and out of related ends of said chamber, an inlet orifice member secured in said inlet bore portion, an outlet orifice member secured in said outlet bore portion, said outlet orifice being formed with a valve seat, a valve positioned in said chamber and adapted, at times, to engage said valve seat, and spring means normally holding the valve off the valve seat, said outlet and inlet orifice members are formed with axial bores extending therethrough, a pin engaged through the axial bore of the inlet orifice member and reaching into the chamber, an enlarged head on said pin bearing against the end of the orifice member remote from the chamber, a valve stem engaged through the axial bore of the outlet orifice member and extending against the chamber, stop means on the valve stem engaged with the end of the outlet orifice member remote from the chamber, said valve stem having an inner end portion, said valve secured on said inner end portion, and a spring secured to said inner end portion and to said pin and biasing the valve away from the valve seat, said inlet and outlet orifice members being removably and adjustably threaded in said inlet and outlet bore portions, respectively.

References Cited

UNITED STATES PATENTS

| 337,236 | 3/1886 | Briscoe | 137—517 |
| 920,716 | 5/1909 | Beckman | 137—517 |
| 2,454,480 | 11/1948 | Rossman | 137—517 X |
| 2,526,346 | 10/1950 | Goldinger | 137—517 X |

FOREIGN PATENTS

| 95,336 | 4/1939 | Sweden. |

ALAN COHAN, *Primary Examiner.*